(12) United States Patent
Itou

(10) Patent No.: US 7,894,640 B2
(45) Date of Patent: Feb. 22, 2011

(54) IDENTIFICATION APPARATUS AND IDENTIFICATION IMAGE DISPLAYING METHOD

(75) Inventor: Katsuyuki Itou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 87 days.

(21) Appl. No.: 12/375,328

(22) PCT Filed: Jul. 27, 2006

(86) PCT No.: PCT/JP2006/314920

§ 371 (c)(1),
(2), (4) Date: Jan. 27, 2009

(87) PCT Pub. No.: WO2008/012905

PCT Pub. Date: Jan. 31, 2008

(65) Prior Publication Data

US 2009/0304239 A1     Dec. 10, 2009

(51) Int. Cl.
G06K 9/00      (2006.01)
H04N 5/76      (2006.01)
(52) U.S. Cl. .................... 382/118; 382/201; 348/231.6
(58) Field of Classification Search ................ 382/100, 382/103, 106, 107, 115, 116, 117, 118, 151, 382/162, 168, 177, 181, 189, 199–203, 209, 382/232, 254, 274, 276, 305, 312; 348/211.99, 348/231.6
See application file for complete search history.

(56) References Cited

U.S. PATENT DOCUMENTS

| 6,819,783 | B2 * | 11/2004 | Goldberg et al. | ............. | 382/115 |
| 7,382,405 | B2 * | 6/2008 | Kusaka et al. | ............. | 348/231.6 |
| 7,412,081 | B2 * | 8/2008 | Doi | ............................ | 382/118 |
| 7,536,034 | B2 * | 5/2009 | Rhoads et al. | ............... | 382/107 |
| 7,561,723 | B2 * | 7/2009 | Goldberg et al. | ............ | 382/115 |
| 2004/0126038 | A1 | 7/2004 | Aublant | | |

(Continued)

FOREIGN PATENT DOCUMENTS

JP      2001215109 A      8/2001

(Continued)

OTHER PUBLICATIONS

Supplementary European Search Report mailed Jul. 2, 2009, issued in corresponding Application No. PCT/JP2006314920, filed Jul. 27, 2006.

*Primary Examiner*—Seyed Azarian
(74) *Attorney, Agent, or Firm*—Seed IP Law Group PLLC

(57) ABSTRACT

It is an object of an identification apparatus of the present invention to realize a face identification in such a way that a system user does not worry that other people take a glance at a user's own face image when the user gets the face image for use in face identification. An identification apparatus of the present invention includes a capturing device 22 for capturing an image, a face template database 254 for storing various images, an alternative image generation controlling portion 251 for specifying a first area, which contains at least a part of a face, out of the image captured by the capturing portion and then replacing the first area of the image captured by the capturing portion with an image stored in the face template database 254, and a displaying device 23 for displaying an image generated by the alternative image generation controlling portion 251.

8 Claims, 8 Drawing Sheets

U.S. PATENT DOCUMENTS

2006/0028558 A1* 2/2006 Sato et al. .............. 348/211.99
2006/0029262 A1* 2/2006 Fujimatsu et al. ........... 382/117

FOREIGN PATENT DOCUMENTS

| | | | |
|---|---|---|---|
| JP | 2002224573 A | 8/2002 |
| JP | 2003317100 A | 11/2003 |
| JP | 2004157771 A | 6/2004 |
| JP | 2005050012 A | 2/2005 |
| JP | 2005157970 A | 6/2005 |

* cited by examiner (a)　　　　　　　　　　　　　(b)

(a)

(b)

(c)

SIZE OF FACE
100 (LATERAL DIRECTION) x
140 (LONGITUDINAL DIRECTION)

COORDINATES OF A CENTER
POSITION OF FACE (50, -70)

(d)

(e)

| DATA NAME | LOCATION OF THE ALTERNATIVE IMAGE |
|---|---|
| Facetype_3.bmp | FACE |
| Eyebrowstype_2.bmp | EYEBROWS |
| Eyetype_5.bmp | EYE |
| Nosetype_1.bmp | NOSE |
| Mouthtype_4.bmp | MOUTH |

| DATA NAME | LOCATION OF THE ALTERNATIVE IMAGE |
|---|---|
| Facetype_3.bmp | FACE |
| Eyebrowstype_2.bmp | EYEBROWS |
| Eyetype_5.bmp | EYE |
| Nosetype_1.bmp | NOSE |
| Mouthtype_4.bmp | MOUTH |

| COORDINATE FACTOR | 5/3 |
|---|---|

| STANDARD SIZE | STANDARD SIZE 60X70 |
|---|---|

IDENTIFICATION APPARATUS AND IDENTIFICATION IMAGE DISPLAYING METHOD

TECHNICAL FIELD

The present invention relates to an identification apparatus and an identification image displaying method, for identifying an individual based on a face identification.

BACKGROUND ART

Out of the newest-model mobile terminal devices, some devices are equipped with a face identifying function that conducts a face identification based on a face image of a human being picked up by a camera (for example, Patent Literature 1). In many cases, upon capturing a user's own face with a camera to extract a user's own face image, the user of the mobile terminal device aligns the user's own face being captured with face register guides, which call upon the user to display a part or all of the picked-up face in a particular position on the display, and then gets the image being displayed on the display as the face image for use in the face identification (In Patent Literature 1, two points displayed on the display correspond to the face register guides, and the user of the mobile terminal device adjusts a capturing direction of the camera, a magnification, a distance between the camera and the face, etc. such that two picked-up eyes coincide with two points, and then gets the image being displayed on the display as the face image for use in the face identification).

Patent Literature 1: JP-A-2003-317100

DISCLOSURE OF THE INVENTION

Problems that the Invention is to Solve

In the mobile terminal device in Patent Literature 1, the user of the device aligns the user's own face image picked up by the camera with the face register guides on the display. However, in this identifying method, the user's own face image is displayed on the display. Therefore, upon getting the face image for use in the face identification, the user of the mobile terminal device has to worry how the user's own face appears to other people via the display. This situation becomes more conspicuous in the case where the face identification is made by utilizing a larger-size display rather than the case where the face identification is made by utilizing a small-size display provided to the mobile terminal device in Patent Literature 1.

The present invention has been made in view of the above circumstance, and it is an object of the present invention to provide an identification apparatus and an identification image displaying method, capable of realizing a face identification in such a way that a system user does not worry that other people take a glance at a user's own face image when such user gets the face image for use in the face identification.

Means for Solving the Problems

An identification apparatus of the present invention for conducting an image identification, includes:

a capturing portion which captures an image;

an image storing portion which stores various images;

a face image specifying portion which specifies a first area, which contains at least a part of a face, out of the image captured by the capturing portion;

an image generating portion which replaces the first area of the image captured by the capturing portion with an image stored in the image storing portion; and a displaying portion which displays an image generated by the image generating portion.

An identification image displaying method of the present invention of conducting an image identification, includes capturing an image;

specifying a first area containing at least a part of a face out of the captured image;

replacing the first area of the captured image with another image; and displaying an image containing the first area that is replaced with another image.

According to this configuration, the user of the identification apparatus can conduct the face identification not to worry that other people take a glance at the user's own face image when the user gets the face image for use in face identification.

Also, in the identification apparatus of the present invention, the image generating portion replaces a second area calculated on the basis of the first area of the image captured by the capturing portion with the image stored in the image storing portion.

Also, an identification image displaying method of the present invention of conducting an image identification, includes:

capturing an image;

specifying a first area containing at least a part of a face out of the captured image;

replacing a second area of the captured image calculated on the basis of the first area with another image; and displaying an image containing the second area that is replaced with another image.

According to this configuration, when the user of the system is caused to execute the operation that aligns the face image with a predetermined position designated by the face register guides, another stored image can be displayed in a position that is suitable for the adjusting operation done by the user.

Also, in the identification apparatus of the present invention, the image generating portion replaces a second area, which is calculated on the basis of a distance between a first point in the image and a second point in the first area, out of the image captured by the capturing portion with the image stored in the image storing portion.

Also, in the identification apparatus of the present invention, the first point coincides with a guide point that serves as an index with which the image captured by the capturing portion is aligned in an image identification.

Also, in the identification apparatus of the present invention, the second point coincides with a center of the first area.

According to this configuration, such a situation can be suppressed that stored another image is widely shifted on the display or is seldom shifted on the display.

Also, in the identification apparatus of the present invention, the image generating portion replaces a third area, which is generated by translating the second area in parallel in response to a positional relationship between the first point and a third point in the image, out of the image captured by the capturing portion with the image stored in the image storing portion.

Also, in the identification apparatus of the present invention, the third point coincides with another guide point that is different in position from the first guide point and serves as an index with which the image captured by the capturing portion is aligned in an image identification.

According to this configuration, even when the adjusting operation is done to shift another image more widely and more conspicuously following upon the shift of the display position of the face image, another image can be contained in the display.

Also, in the identification apparatus of the present invention, the image generating portion replaces a fourth area, which is enlarged/reduced around at least a center of the second area and a center of the third area as basic points, out of the image captured by the capturing portion with the image stored in the image storing portion.

According to this configuration, when a size of another image can be set arbitrarily irrespective of a size of the specified first area, the user of the identification apparatus can do more comfortably the adjusting operation to align the face image with a predetermined position that is designated by the face register guides on the display.

Also, the identification apparatus of the present invention further includes an identification image storing portion which stores an images that are referred to in identifying the image; and an identifying portion which conducts an image identification based on the image captured by the capturing portion and an image stored in the identification image storing portion.

According to this configuration, as described above, since the user of the identification apparatus can get the face image not to worry that other people take a glance at the user's own face image for use in face identification, such user can conduct the face identification more comfortably.

ADVANTAGE OF THE INVENTION

According to the identification apparatus and the identification image displaying method of the present invention the user of the identification apparatus can conduct the face identification not to worry that other people take a glance at the user's own face image when the user gets the face image for use in face identification.

BRIEF DESCRIPTION OF THE DRAWINGS

FIG. 1 Display examples displayed on a display in identifying a face, wherein FIG. 1(a) is a display example displayed on a display when a face is identified by an identification apparatus in the prior art, and FIG. 1(b) is a display example displayed on a display when a face is identified by an identification apparatus of embodiments of the present invention.

FIG. 4 A conceptual view of face image data in the course of data processing wherein FIG. 4(a) is a schematic view of an image derived by extracting areas whose histogram value is high from an image containing a face, FIG. 4(b) is a schematic view of an image derived by applying an edge detection to the image containing the face, FIG. 4(c) is a schematic view showing areas in which respective parts constituting the face are specified, FIG. 4(d) is a calculation example of a face shape, and FIG. 4(e) is a display example of image data in which the area specified as the face shape is replaced with an alternative image.

FIG. 7 Display examples of the image displayed in capturing and the alternative image by an identification apparatus of a second embodiment of the present invention, wherein FIG. 7(a) to FIG. 7(c) show the transition of the image displayed on a display device 23 during the capturing of a capturing device 22, and FIG. 7(d) to FIG. 7(f) show the transition of the image and the alternative image displayed on the display device 23 during the capturing of the capturing device 22.

FIG. 8 A registration example of alternative image data.

FIG. 9 Display examples of the image displayed in capturing and the alternative image by the identification apparatus of the second embodiment of the present invention, wherein FIG. 9(a) is a display example of the alternative image when the picked-up face image is large, and FIG. 9(b) is a display example of the alternative image when the picked-up face image is small.

FIG. 10 Display examples of the image displayed in capturing and the alternative image by an identification apparatus of a third embodiment of the present invention, wherein FIG. 10(a) to FIG. 10(c) show the transition of the image displayed on the display device 23 during the capturing of the capturing device 22.

Figure 1:
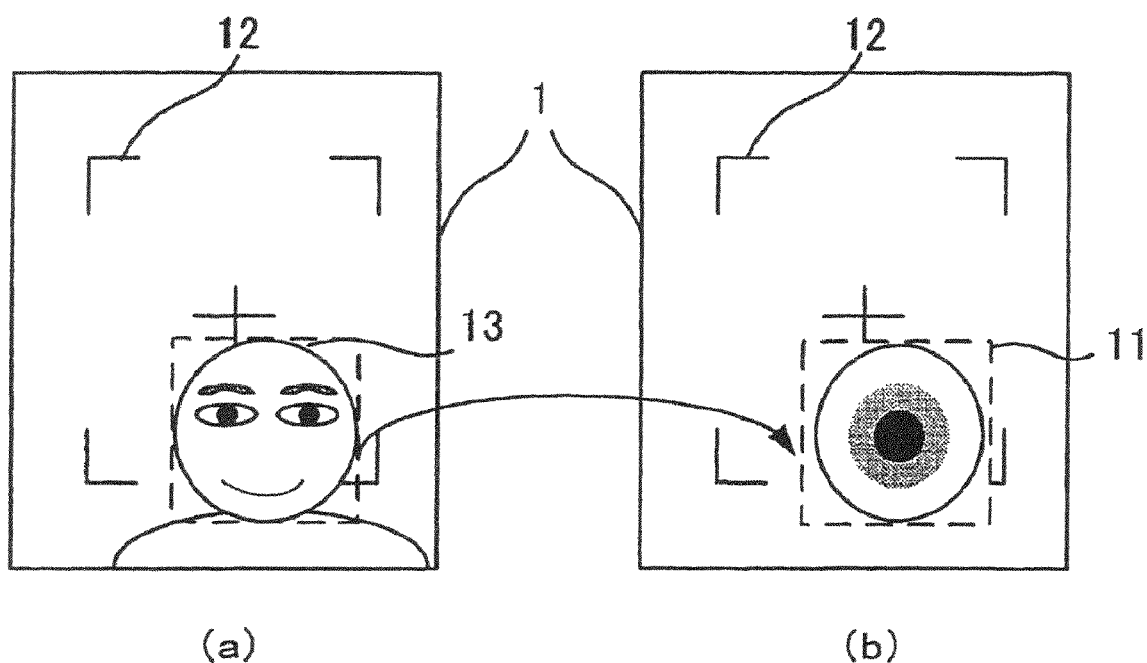

DESCRIPTION OF REFERENCE NUMERALS 1 display
11, 41, 71, 91, 101 alternative image
12, 42, 72, 92, 102 face register guide
13, 73, 93, 103 face image
21 controlling portion
22 capturing device
23 displaying device
24 operation key
25 alternative image outputting device
251, 351, 451 alternative image generation controlling portion
252, 352 alternative image information storing portion
253 face part extracting portion
254 face template database
26 image identifying apparatus
261 identifying portion
262 registered image database

BEST MODE FOR CARRYING OUT THE INVENTION

An outline of processes in an identification apparatus of embodiments of the present invention will be explained hereinafter. A display example displayed on a display when a face is identified by an identification apparatus in the prior art is shown in FIG. 1(a), and a display example displayed on a display when a face is identified by an identification apparatus of embodiments of the present invention is shown in FIG. 1(b).

In the identification apparatus in the prior art, as shown in FIG. 1(a), the user of the identification apparatus in the prior art adjusts a user's own face image 13 picked up by a camera to align the image with face register guides 12 on a display 1, and then gets the image being captured (i.e., the image being displayed on the display 1) as the face image for use in the face identification. In the identification apparatus in the prior art, since the user's own face image 13 is displayed on the display 1, the user of the identification apparatus has to worry that other people take a glance at the user's own face for use in the face identification via the display 1.

In contrast, in the identification apparatus of embodiments of the present invention, an image area (in FIG. 1(a), an area encircled with a dotted line) corresponding to the face (or a part of parts of the face such as eye, nose, mouth, or the like) is specified from the image picked up by the camera, and then another image 11 with which the specified image area is replaced is displayed on the display 1. Then, while looking at the display 1 on which this another image 11 (referred to as an "alternative image 11" hereinafter) is displayed in a position where the user's face image picked up by the camera is to be displayed originally, as shown in FIG. 1(*b*), the user of the identification apparatus of embodiments of the present invention adjust the alternative image 11 to align it with the face register guides 12 on the display 1, and then gets the image being captured as the face image for use in the face identification. According to the identification apparatus of embodiments of the present invention, when the user of the identification apparatus displays the image picked up by the camera on the display 1 to get the face image for use in the face identification, such user displays the alternative image 11 in the location corresponding to the user's face in that image. Therefore, the user of the identification apparatus can conduct the face identification such that the user does not worry that other people take a glance at the face image when such user gets the face image for use in the face identification. Then, the identification apparatus of embodiments of the present invention will be explained in detail hereunder.

First Embodiment

Figure 2:
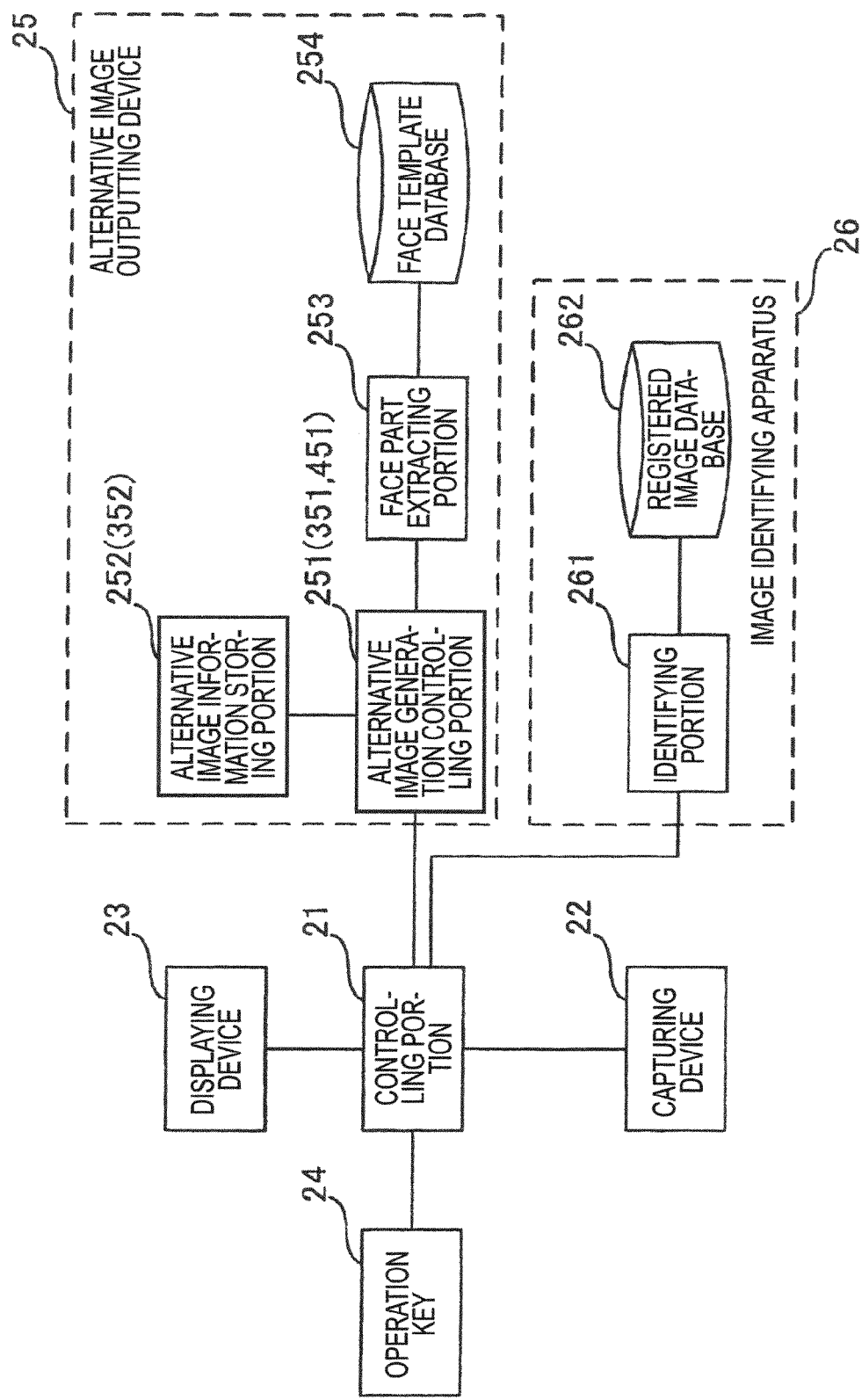
FIG. 2 A configurative view illustrating a configuration of an identification apparatus of a first embodiment of the present invention.

First, an identification apparatus of a first embodiment of the present invention will be explained in detail hereunder. A configurative view illustrating a configuration of an identification apparatus of a first embodiment of the present invention is shown in FIG. 2.

The identification apparatus of the first embodiment of the present invention is constructed to include a controlling portion 21, a capturing device 22, a displaying device 23, an operation key 24, an alternative image outputting device 25, and an image identifying apparatus 26

The controlling portion 21 is composed of a microprocessor (CPU), and executes drive control of the capturing device 22 and input/output control of image information, display control of the displaying device 23, input control of signals from the operation key 24, input/output control of image into/from the alternative image outputting device 25, control of an image identifying process of the image identifying apparatus 26, and others.

The capturing device 22 converts color information input by using a semiconductor device such as CCD, CMOS, or the like into electric signals in response to a drive control signal from the controlling portion 21, and outputs image data to the controlling portion 21

The displaying device 23 outputs the screen corresponding to the image data fed from the controlling portion 21 to a display panel. The displaying device 23 is constructed by a liquid crystal display (LCD), for example, when the identification apparatus of the present invention is applied to the mobile terminal device. In this case, another display device such as CRT display, PDP, or the like may be substituted for this LCD.

The operation key 24 accepts the operation from the user of the identification apparatus of the present invention, and outputs a signal answering to the operation to the controlling portion 21. The operation key 24 consists of a panel on which a cursor is moved arbitrarily, numeric keys of 0 to 9, a QWERTY key, and the like, for example, and the user informs the identification apparatus of various commands by the operation of the operation key 24. In particular, when the identification apparatus of the present invention is applied to the mobile terminal device, a capturing key for starting the capturing may be provided separately to the capturing device 22, and an identification start key for starting the face identification may be provided separately to the identification apparatus.

The alternative image outputting device 25 is constructed to include an alternative image generation controlling portion 251, an alternative image information storing portion 252, a face part extracting portion 253, and a face template database 254. A flow of the alternative image generating process by the alternative image outputting device 25 and the image display controlling process by the controlling portion 21 will be explained with reference to a flowchart showing processing steps executed by the identification apparatus of the first embodiment of the present invention and shown in FIG. 3.

When the controlling portion 21 accepts the operation from the operation key 24 to start the face identification, it outputs a drive control signal to the capturing device 22 to start the capturing. When the controlling portion 21 receives the image data from the capturing device 22 (step S301), such controlling portion displays the face register guides read from the image identifying apparatus 26 having an image identifying function on the displaying device 23 (step S302), and then decides whether or not the setting for displaying the alternative image is given (step S303). In this case, the setting indicating whether the alternative image should be displayed or not may be set before the capturing device 22 is caused to start the capturing, otherwise the operation deciding whether the alternative image should be displayed or not every time when the capturing device 22 is caused to start the capturing may be input by the operation key 24. If the controlling portion 21 decides that the setting for displaying the alternative image is not given (step S303, No), such controlling portion outputs the image data accepted from the capturing device 22 to the displaying device 23 (step S310). In contrast, if the controlling portion 21 decides that the setting for displaying the alternative image is given (step S303, Yes), such controlling portion outputs the image data accepted from the capturing device 22 to the alternative image outputting device 25.

When the alternative image generation controlling portion 251 receives the image data from the controlling portion 21, such controlling portion decides whether or not an area corresponding to a face of a human body is contained in the image data (step S304). If this controlling portion decides that the area corresponding to the face is contained (step S305, Yes), it specifies a shape of the face and shapes of respective parts constituting the face (step S306). An example of a method of deciding whether or not the area corresponding to the face is detected and a method of specifying a shape of the face will be explained with reference to a conceptual view of face image data in the course of data processing shown in FIG. 4.

Figure 4:
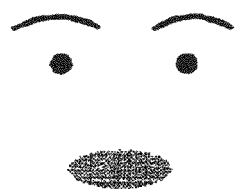
Figure 4:
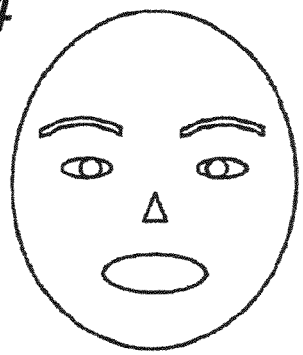
Figure 4:
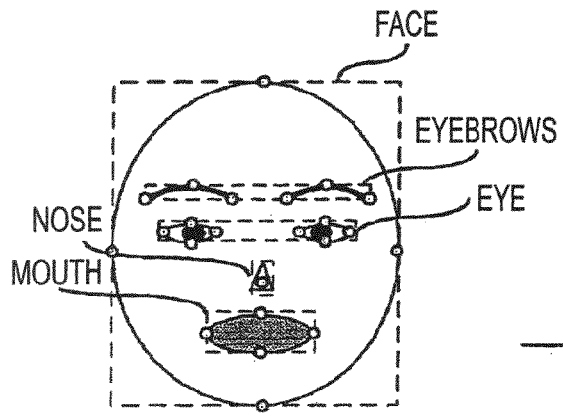
Figure 4:
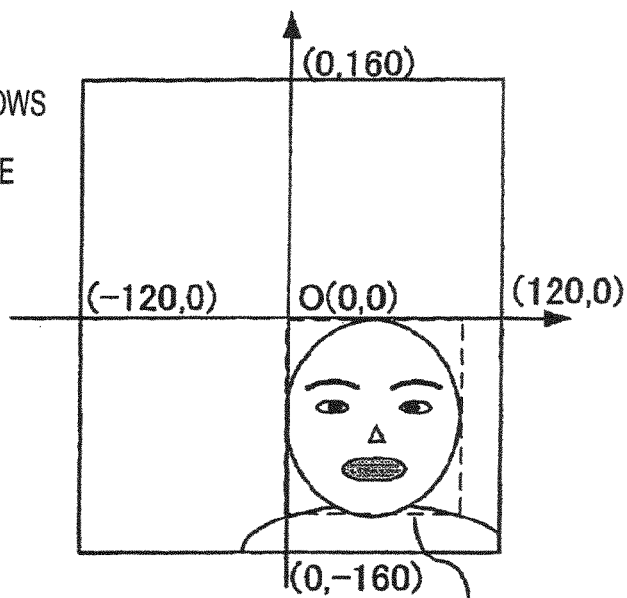
Figure 4:
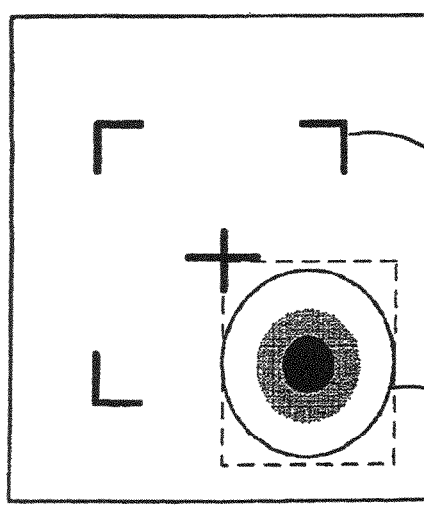

First, the alternative image generation controlling portion 251 applies a process, which makes a histogram value higher in the area in which pixels of higher (or lower) luminance are gathered densely, to the image data input from the controlling portion 21, and extracts position coordinates constituting the areas whose histogram value is high (concretely, the coordinates of the concerned pixel in the coordinate system in which any one pixel in the image data is set as an origin (0, 0)). FIG. 4(*a*) is a schematic view of an image derived by extracting areas whose histogram value is high from an image containing a face. The black or gray colored location in FIG. 4(*a*) corresponds to the location whose histogram value is high (i.e., eyebrows, iris of the eye, mouth). Also, the alternative image generation controlling portion 251 extracts the position coordinates of a profile of the image data that is emphasized by applying the edge detection to the image data being input from the controlling portion 21. FIG. 4(b) is a schematic view of the image derived by applying the edge detection to the image in which the face is contained. A solid line in FIG. 4(b) corresponds to the emphasized profile, and the locations in which a difference of luminance between the adjacent pixels is large (i.e., the locations corresponding to the profiles of eyebrows, eye, nose, mouth) are extracted.

The alternative image generation controlling portion 251 decides whether or not the concerned image data contain the area corresponding to the face of the human body, based on the geometrical shape formed by the position coordinates, from which the locations whose histogram is high are extracted, out of the position coordinates being extracted by two processes respectively and the histogram values in respective position coordinates. Concretely, the fact that the locations corresponding to eyebrows and iris of the eye have the histogram value in the same extent and the fact that the locations corresponding to eyebrows and iris of the eye tend to have the higher histogram value than the location corresponding to mouth are employed as the criteria. Therefore, if three other areas whose histogram value is high in the same extent (corresponding to remaining three locations out of the eyebrows and the irises of the eyes) exist in a predetermined range calculated from a size of one area whose histogram value is high (corresponding to any one of the eyebrows and the irises of the eyes) and the fifth area whose histogram value is lower than those in above four areas (corresponding to the mouth) exists in a predetermined direction being calculated from the positions coordinates in above four areas, the alternative image generation controlling portion 251 decides that the concerned image data contain the area corresponding to the face of the human body.

Then, the alternative image generation controlling portion 251 specifies a shape of the face in the image data and shapes of respective parts constituting the face, based on the position coordinates of the profile of the image data, to which the edge detection is applied, out of the position coordinates extracted by above two processes respectively. That is, the alternative image generation controlling portion 251 specifies respective profiles as the eyebrows, the irises of the eyes, and the mouth, based on the profiles containing above five areas whose histogram value is high therein and their positional relationships among five areas. When the profile of the eye is specified, the profile containing the iris of the eye therein is specified as the eye. In a schematic view shown FIG. 4(c) and showing areas in which respective parts constituting the face are specified, a pair of parts are recognized as one area of the eyebrows, but respective parts may be recognized as the separate area (this is similarly true of the eyes). The alternative image generation controlling portion 251 calculates minimum squares (squares formed by a dotted line in FIG. 4(c)) containing end portions (dots arranged on the profiles in FIG. 4(c)) out of these profiles on these lines as the shapes of the eyebrows, the eye, and the mouth. Also, the alternative image generation controlling portion 251 specifies the profile of the nose from the positional relationships among the specified eyebrows, eye, and mouth, and similarly specifies the profile of the face containing the eyebrows, the eye, the mouth, and the nose therein. The alternative image generation controlling portion 251 calculates minimum squares surrounding the profiles of the nose and the face as the specified shapes of the nose and the face, like the case of the eyebrows, the eye, and the mouth.

Also, the alternative image generation controlling portion 251 calculates sizes of the squares calculated as described above (the number of pixels in respective position coordinate directions in the areas encircled by the squares) and center position coordinates every profile of respective parts. In a calculation example of a face shape shown in FIG. 4(d), an example in which a size (100×140) and center position coordinates (50, −70) of the face shape are calculated is illustrated in the coordinate system in which one pixel at the center in the image data is set as an origin (0, 0). As the method of setting the positions coordinates of the origin, the conditions for pointing the pixel on the image data with which a center of the face register guides is aligned (for example, the pixel specified by the alignment number positioned at a predetermined rate of a total number of pixels in the alignment representing the pixels in the longitudinal direction (or the lateral direction) is set to the origin. In the case in FIG. 4(d), the pixel specified by the alignment number positioned at 50 percent of a total number of pixels is set to the origin) are set in the image identifying apparatus 26, and then the controlling portion 21 reads the conditions together with the face register guides from the image identifying apparatus 26 in the process in step S302 and sets the pixel designated in these conditions as the origin (0, 0). In FIG. 4(d), the size and the center position coordinates of only the square being calculated as the face shape are recited, but the size and the center position coordinates of respective squares of the eyebrow, the eye, the mouth, and the nose can be calculated similarly.

As described above, the alternative image generation controlling portion 251 decides whether or not the area corresponding to the face of the human body is contained in the image data. Then, when the alternative image generation controlling portion 251 decides that such area is contained, it specifies the shape of the face and shapes of respective parts constituting the face.

Figures 5, 6:
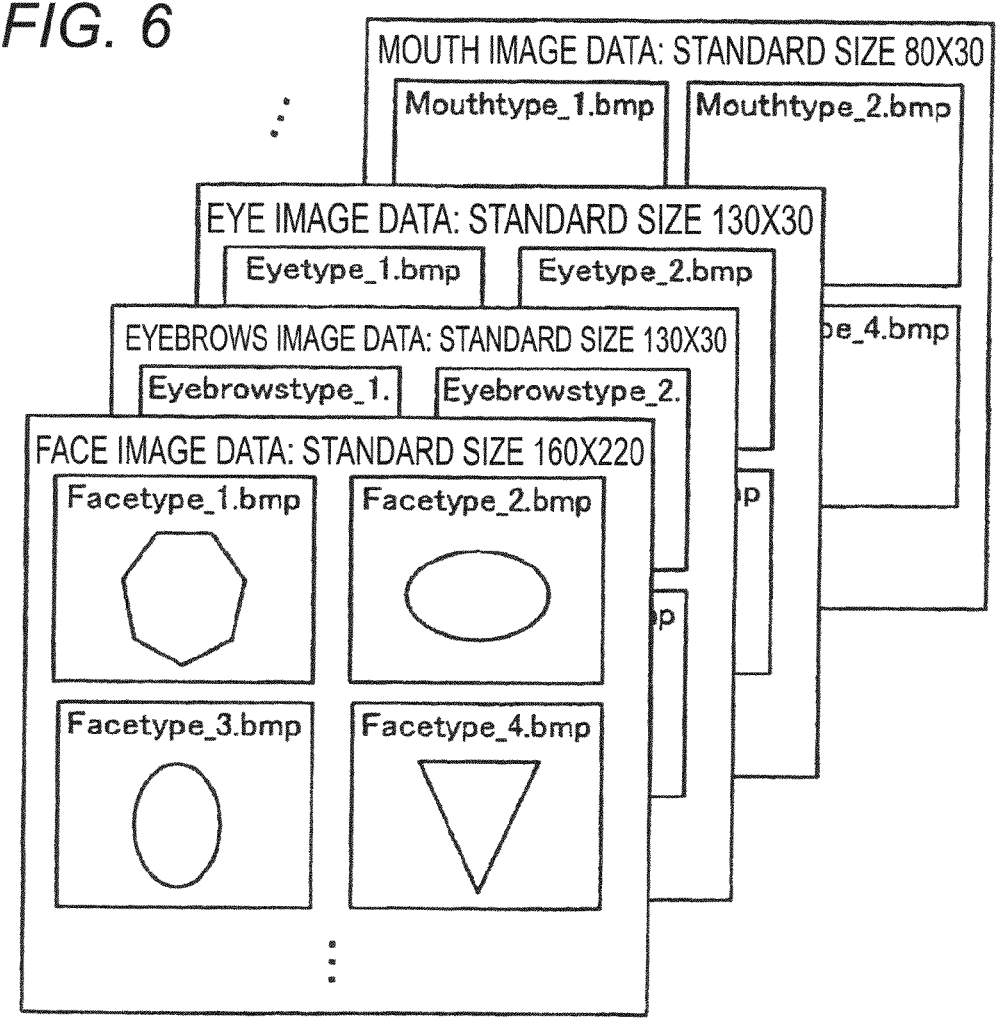
FIG. 5 A registration example of alternative image data.
FIG. 6 A conceptual view of recorded alternative image data.

Then, when the alternative image generation controlling portion 251 decides that the area corresponding to the face of the human body is contained in the image data, it acquires the image data that is substituted for the area from the face template database 254 (step S307). Concretely, the alternative image generation controlling portion 251 reads the data name of the alternative image to be replaced and the part to be replaced with the alternative image from the alternative image information storing portion 252, and informs the face part extracting portion 253 of the data name and the part. The information applicable to specify the image data as the alternative image are registered beforehand in the alternative image information storing portion 252. For example, as shown in a registration example of the alternative image data in FIG. 5, the alternative image information storing portion 252 stores the name of the image data uses as the alternative image and parts constituting the face and replaced with the alternative image to hold a correlation between them.

The face part extracting portion 253, when informed of the data name and the part to be replaced with the alternative image from the alternative image generation controlling portion 251, extracts the concerned data from the face template database 254. The image data to be used as the alternative image are recorded in the face template database 254. For example, as shown in a conceptual view of recorded alternative image data in FIG. 6, the face template database 254 records plural pieces of alternative image data (in FIG. 6, the alternative image data of the part "face" is set forth as "Facetype_1.bmp", "Facetype_2.bmp", ..., "Facetype_N.bmp") every part constituting the face such as face, eyebrows, eye, or the like. The face part extracting portion 253 outputs the extracted alternative image data to the alternative image generation controlling portion 251 while correlating with the part to be replaced with the alternative image.

When the alternative image generation controlling portion 251 received the alternative image data that is correlated with the part to be replaced with the alternative image from the face part extracting portion 253, it replaces each square area, which is specified as the shape of face, eyebrows, eye, nose, or mouth, out of the image data being picked up by the capturing device 22 and input from the controlling portion 21 with the alternative image corresponding to that part (step S308). In this event, such a situation may be considered that a size of the square area specified as the shape of each part does not coincide with a size of the alternative image (e.g., a standard size of the image data of each part shown in FIG. 6). In such situation, one pattern of the alternative image can be replaced with the parts in various sizes by enlarging/reducing the alternative image to meet a size of the square area. The alternative image generation controlling portion 251 outputs the image data a part of which is replaced with the alternative image to the controlling portion 21.

The controlling portion 21 outputs the image data received from the alternative image outputting device 25 to the displaying device 23, and causes the displaying device 23 to display a screen corresponding to the image data (step S309). In FIG. 4(e), a display example of the image data in which the area specified as the face shape is replaced with the alternative image is shown. While looking at the display device 23 on which an alternative image 41 is displayed in the position where the user's face image picked up by the camera is to be displayed originally, as shown in FIG. 4(e), the user of the identification apparatus of the first embodiment of the present invention adjusts the alternative image 41 to align it with a face register guides 42 of the display device 23, and then executes the operation to get the image being captured as the face image for use in the face identification. The controlling portion 21 continues the processes from steps S301 to S309 until it accepts the operation that is made by the operation key 24 to get the image being captured as the face image for use in the face identification (S311). The controlling portion 21 outputs the image data being accepted from the capturing device 22 immediately after (or before) the operation is accepted to the image identifying apparatus 26 (step S310).

An identifying portion 261 conducts an identification of the image data being input from the controlling portion 21 and the image registered in a registered image database 262, and sends back the identified result to the controlling portion 21 (step S312).

According to the identification apparatus of the first embodiment of the present invention, when the user of the identification apparatus displays the image picked up by the camera on the display to get the face image for use in the face identification, such user displays the alternative image in the location corresponding to the user's face in that image. Therefore, the user of the identification apparatus can conduct the face identification such that the user does not worry that other people take a glance at the face image when such user gets the face image for use in the face identification. As a result, the user of the identification apparatus of the present invention can conduct the face image identification more comfortably.

Here, in the identification apparatus of the first embodiment of the present invention, plural images utilized as the face register guides may be recorded in the image identifying apparatus 26, and then the controlling portion 21 may read any one of these images upon reading the face register guides from the image identifying apparatus 26 (concretely, the information applicable to specify the image data used as the face register guides may be registered in the image identifying apparatus 26, and the controlling portion 21 may read the face register guides from the image identifying apparatus 26 based on the information).

Second Embodiment

Next, an identification apparatus of a second embodiment of the present invention will be explained in detail hereunder.

In order to get the image being captured as the face image for use in the face identification, the user of the identification apparatus of the embodiment of the present invention must adjust the face image to align it with the face register guides on the display, while looking at the display on which the user's own face image being captured with the camera is displayed. The user executes the operation to align the face image with the face register guides while setting a focal position or a magnification of the camera, changing the capturing direction of the camera, or adjusting a distance between the camera and the subject. When the user performs these operations manually, it is difficult for the user to align the face image with a predetermined position designated by the face register guides on the display and then fix the face image in that position. In particular, in case the face image should be aligned with a predetermined position designated by the face register guides on the display by using the newest-model cellular phone that is equipped with an identifying function, a mechanism of the cellular phone is not always fit for changing the capturing direction of the camera when the capturing direction of the camera is changed by changing the direction of the cellular phone. Therefore, such a situation may be considered that either the face image is widely moved on the display or the face image is seldom moved on the display.

In the identification apparatus of the second embodiment of the present invention, the identification apparatus capable of displaying the alternative image in a position preferable to the adjusting operation done by the user, i.e., capable of suppressing the situation that either the alternative image is widely moved on the display or the alternative image is seldom moved on the display, when the user of the system is caused to adjust an alignment of the face image with a predetermined position designated by the face register guides on the display will be explained hereunder. An outline of the process executed by the identification apparatus of the second embodiment of the present invention will be explained hereunder.

Figure 7:
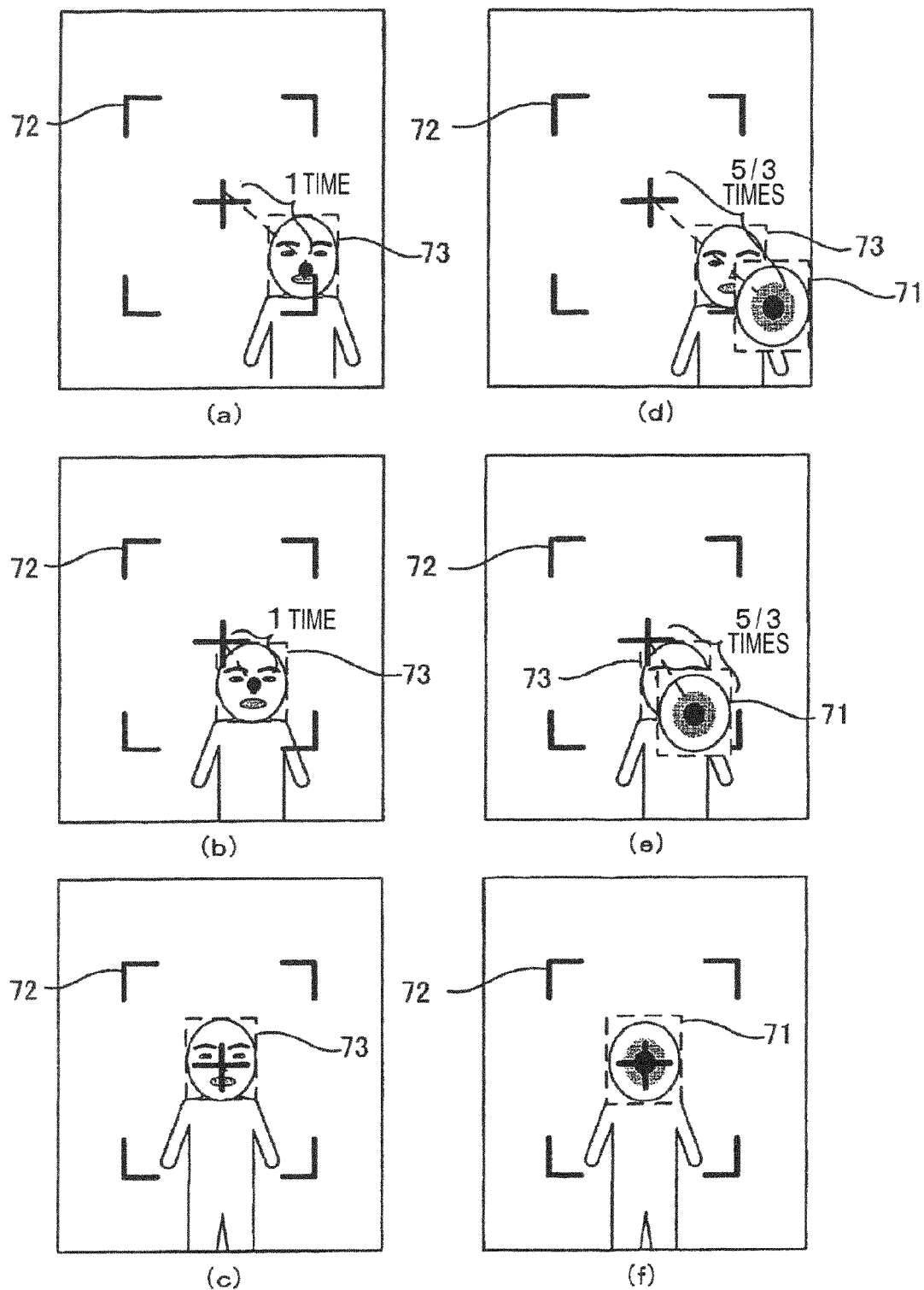

Display examples of the image and the alternative image displayed in capturing by an identification apparatus of a second embodiment of the present invention are shown in FIG. 7. Here, FIG. 7(a) to FIG. 7(c) show the transition of the image displayed on the display device 23 during the capturing of the capturing device 22, and FIG. 7(d) to FIG. (F) show the transition of the image and the alternative image displayed on the display device 23 during the capturing of the capturing device 22. Also, al FIG. 7(a) to FIG. 7(c) and FIG. 7(d) to FIG. (f) show the case where the capturing is done while shifting the face of the subject to a center of face register guides 72.

In the identification apparatus of the first embodiment of the present invention, as shown in FIG. 7(a) to FIG. 7(c), when the capturing is done while shifting the face of the subject to a center of the face register guides 72, a square area 73 specified as a face shape and encircled with a dotted line is replaced with an alternative image 71 and then displayed on the display device 23. In contrast, in the identification apparatus of the second embodiment of the present invention, as shown in FIG. 7(d) to FIG. 7(f), when the capturing is done while shifting the face of the subject to a center of the face register guides 72, the square area specified as the face shape and encircled with the dotted line is replaced with the alternative image 71 in such a manner that the position coordinates, which are given as a real-number multiple (in FIG. 7, a 5/3 multiple) of the center coordinates of this square area around an origin (0, 0) (in FIG. 7, a point at which cross hairs as a part of the face register guides 72 intersect with each other is used as an origin) as a reference point, coincides with a center position of the alternative image 71, and then the alternative image 71 is displayed on the display device 23. In FIG. 7(d) to FIG. 7(f), a difference between a display position of the area 73 specified as the face shape and a display position of the alternative image 71 becomes smaller (in FIG. 7, from FIG. 7(a) and FIG. 7(b)) as the face of the subject comes closer to the center of the face register guides 72. Then, when the display position of the area 73 specified as the face shape comes close to the origin, the display position of the area 73 specified as the face shape substantially coincides with the display position of the alternative image 71 (in FIG. 7, FIG. 7(c)).

In the identification apparatus of the second embodiment of the present invention, it is not said that the display position of the area 73 specified as the face shape always coincides with the display position of the alternative image 71. However, sometimes the user of this identification apparatus can do easily the above adjusting operation upon picking up the face image for the purpose of face identification in such a condition that the alternative image should be shifted more widely and more conspicuously following upon the shift of the display position of the face image. In particular, it may be considered that, in a situation that the user's face image is largely away from the face register guides and thus the careful adjusting operation is not so requested, the user can do more easily the adjusting operation if the alternative image is shifted more conspicuously even though a large difference arises between the display position of the area specified as the face shape and the display position of the alternative image.

Also, in FIG. 7, the case where the alternative image 71 is displayed on the position coordinates that are a 5/3 multiple of the center position coordinates of the area 73 specified as the face shape around the origin is illustrated. In this case, the alternative image 71 may be displayed on the position coordinates that are obtained by multiplying the center position coordinates of the area 73 specified as the face shape by a multiple below 1 around the origin. According to this configuration, sometimes the user of this identification apparatus can do easily the above adjusting operation upon picking up the face image for use in the face identification in such a condition that the alternative image should be shifted smaller and more finely following upon the shift of the display position of the face image. In particular, it may be considered that, in a situation that the user's face image is positioned close to the face register guides and thus the careful adjusting operation is requested, the user can do more easily the adjusting operation if the alternative image is shifted more finely.

Figure 3:
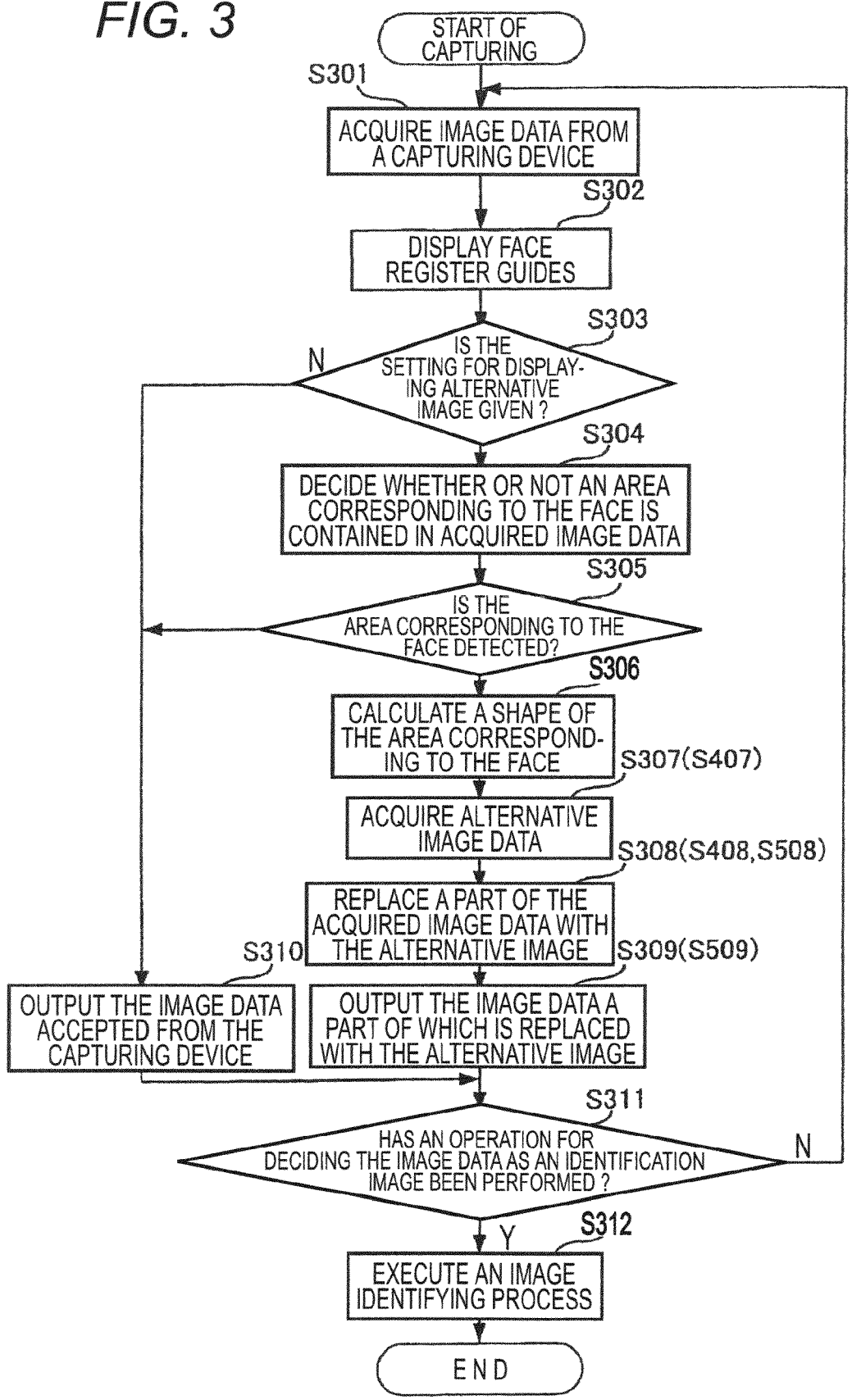
FIG. 3 A flowchart showing processing steps executed by the identification apparatus of the first embodiment of the present invention.

The identification apparatus of the second embodiment of the present invention will be explained in detail hereunder. In the identification apparatus of the second embodiment of the present invention, functions are added to the alternative image generation controlling portion and the alternative image information storing portion (in order to discriminate them from the alternative image generation controlling portion 215 and the alternative image information storing portion 252 in the first embodiment, a reference numeral "351" is allocated to the alternative image generation controlling portion and reference numeral "352" is allocated to the alternative image information storing portion in the second embodiment). In this case, since the configuration of the identification apparatus of the second embodiment of the present invention is the same as that of the first embodiment and also the same reference numerals as those shown in FIG. 2 denotes the same portions explained in the first embodiment, their explanation in the second embodiment will be omitted herein. Also, since the processing steps executed by the identification apparatus of the second embodiment of the present invention are common except the process in steps S307 and S308 out of the flowchart shown in FIG. 3 are different, their explanation in the second embodiment will be omitted herein.

When an alternative image generation controlling portion 351 decides that the area corresponding to the face of the human body is contained in the image data, it acquires the image data to be replaced with the area from the face template database 254 (step S407. Here, "S407" is allocated as the reference numeral to distinguish this step from the step S307 explained in the first embodiment). Concretely, the alternative image generation controlling portion 351 reads a data name of the alternative image to be replaced, the part to be replaced with the alternative image, and a numerical value indicating a magnification applied to enlarge/reduce the center position coordinate of the area specified as the shape of each part around an origin (0, 0) as a reference point (referred to as a "coordinate factor" hereinafter) from an alternative image information storing portion 352, and informs the face part extracting portion 253 of the data name and the part. The information applicable to specify the image data used as the alternative image and the coordinate factors are registered previously in the alternative image information storing portion 352. For example, as shown in a registration example of the alternative image data in FIG. 8, the alternative image information storing portion 352 stores the name of the image data used as the alternative image, the part to be replaced with the alternative image and constituting the face, and the coordinate factor 5/3 to correlate them with each other.

When the alternative image generation controlling portion 351 receives the alternative image data being correlated with the part to be replaced with the alternative image from the face part extracting portion 253, it multiplies the center coordinates (50, −70) of each square area, which is specified as the face shape out of the image data picked up by the capturing device 22 and input from the controlling portion 21, by the coordinate factor 5/3. Then, the alternative image generation controlling portion 351 aligns the center position of the alternative image with the position coordinate (83, −117) obtained by the multiplication, and then replaces this part with the alternative image corresponding to that part (step S408. Here, "S408" is allocated as the reference numeral to distinguish this step from the step S308 explained in the first embodiment). Then, the alternative image generation controlling portion 351 outputs the image data a part of which is replaced with the alternative image to the controlling portion 21.

Figures 8, 9:
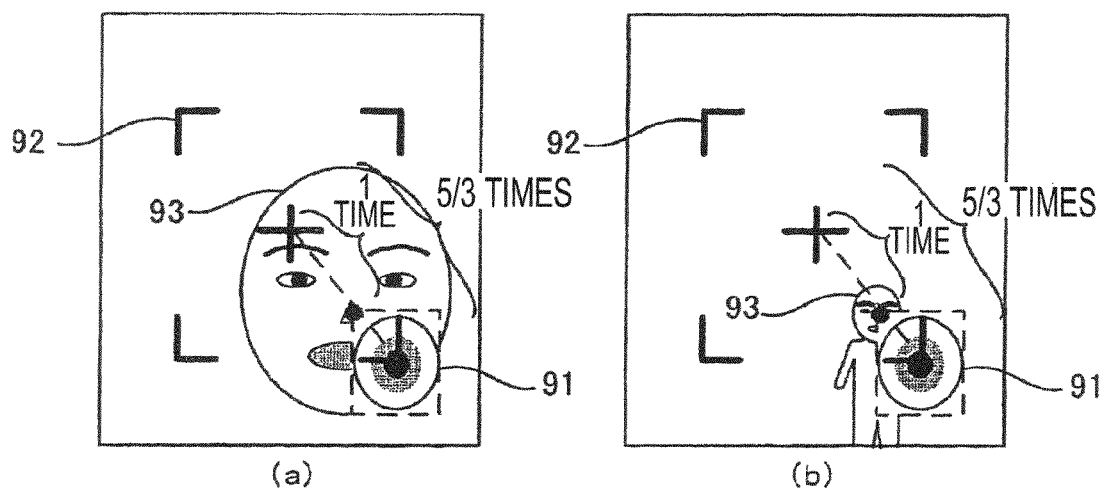

In this case, in the identification apparatus of the second embodiment of the present invention, as shown in FIG. 7, so long as the display position of the area 73 specified as the face shape does not always coincide with the display position of the alternative image 71, either a size of the alternative image 71 may be made to coincide with a size of the square area 73 specified as the shape of each part or not. It is preferable that the alternative image generation controlling portion 351 should enlarge/reduce the size of the alternative image 71 in response to the shape of the face register guides 72. For example, display examples of the image displayed in capturing and the alternative image by the identification apparatus of the second embodiment of the present invention are shown in FIG. 9 (FIG. 9(a) is a display example of the alternative image when the picked-up face image is large, and FIG. 9(b) is a display example of the alternative image when the picked-up face image is small). If an alternative image 91 can be set constantly to a standard size, which is preferable to the shape of face register guides 92, irrespective of a size of a square area 93 specified as the face shape, the user of the identification apparatus can do more comfortably the adjusting operation to align the face image with a predetermined position designated by the face register guides on the display. In this event, in order to accomplish this process, the standard size is stored in advance in the alternative image information storing portion 352, and then the alternative image generation controlling portion 351 reads this standard size from the alternative image information storing portion 352 (step S407), and replaces the enlarged/reduced alternative image with the standard size when the image is to be replaced with the alternative image corresponding to each part (step S408).

As described above, according to the identification apparatus of the second embodiment of the present invention, when the user of the identification apparatus displays the image picked up by the camera on the display to get the face image for use in the face identification, such user displays the alternative image in the location corresponding to the user's face in that image. Therefore, the user of the identification apparatus can conduct the face identification not to worry that other people take a glance at the user's own face image when the user gets the face image for use in face identification. As a result, the user of the identification apparatus of the present invention can conduct more comfortably the identification of the face image.

Also, in the identification apparatus of the second embodiment of the present invention, the user of this identification apparatus can shift the alternative image more widely and more conspicuously following upon the shift of the display position of the face image or can shift the alternative image smaller and more finely following upon the shift of the display position of the face image. Therefore, the user of the identification apparatus can do more comfortably the operation to align the face image with the face register guides. Such advantage cannot be expected by the identification apparatus in the prior art, which acquires the face image that is aligned directly with the face register guides to get the image being captured as the face image for use in the face identification.

In the identification apparatus of the second embodiment of the present invention, as shown in FIG. 7, a distance between the center position coordinates of the area 73 specified as the face shape and the origin O is multiplied by the coordinate factor (constant), and then the alternative image 71 is replaced such that the center position of the alternative image 71 coincides with the multiplied position coordinates. In this case, a variable k that is derived depending on the distance between the center position coordinates of the area 73 specified as the face shape and the origin O may be employed as the coordinate factor instead of the constant. As an example of the coordinate factor k, "k=a×(a distance between the center position coordinates of the area 73 and the origin O)×(a distance between the center position coordinates of the area 73 and the origin O)" may be listed. According to this coordinate factor k, the alternative image is largely shifted even when the face image 73 is slightly shifted in a situation that the user's face image 73 is largely away from the face register guides 72, while the alternative image is seldom shifted even when the face image 73 is largely shifted in a situation that the user's face image 73 is positioned close to the face register guides 72. As a result, the preferred operability responding to the positional relationship between the face register guides 72 and the face image 73 can be provided in the operation that aligns the face image with the face register guides. Here, a method of calculating the coordinate factor k is not limited to this approach, and various calculating methods may be considered.

Third Embodiment

Next, an identification apparatus of a third embodiment of the present invention will be explained in detail hereunder.

Figure 10:
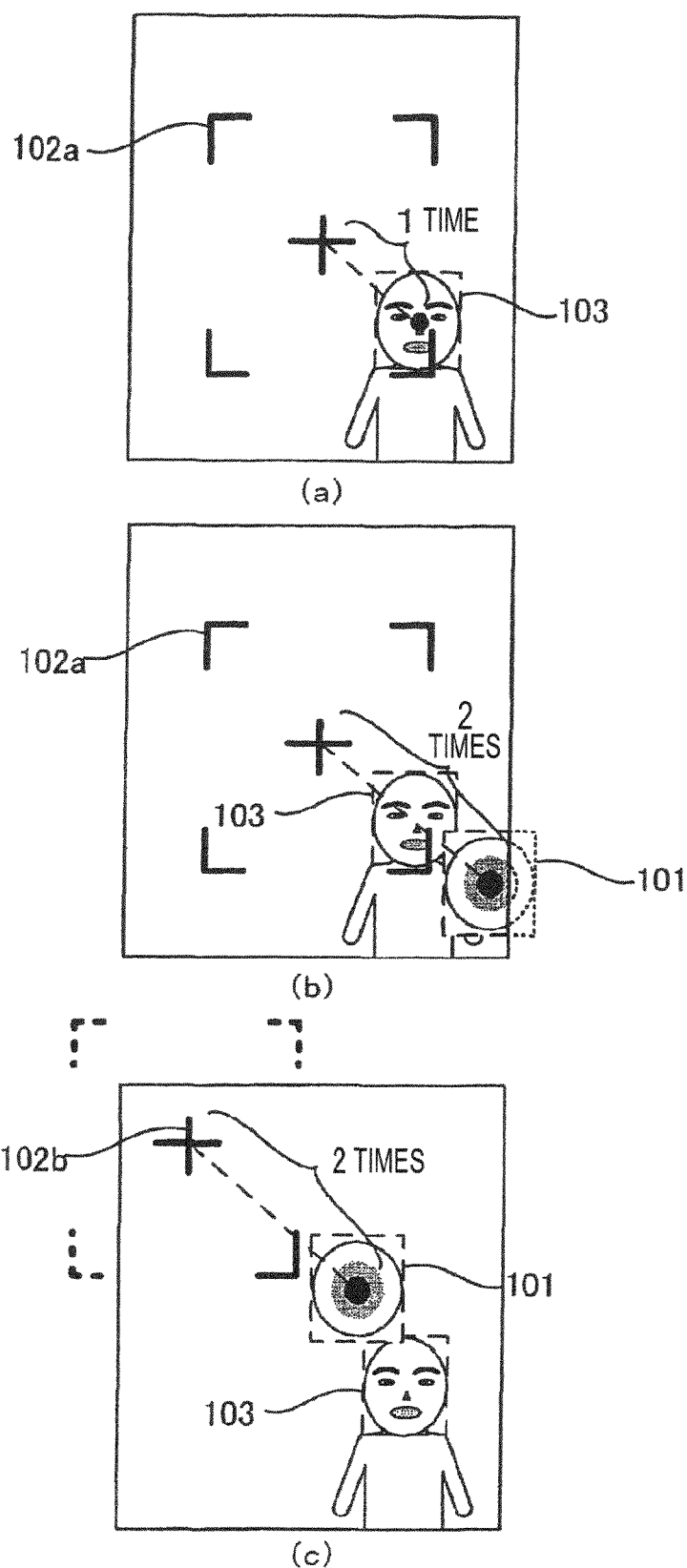

In the case of the identification apparatus of the second embodiment of the present invention, such a case may be considered that, when the alternative image is replaced such that the center position of the alternative image coincides with the position coordinate that is multiplied by the coordinate factor, a part of the position coordinate that is multiplied by the coordinate factor or the replaced alternative image indicates the pixel out of a range of the image data depending on a value of the coordinate factor. Display examples of the image displayed in capturing and the alternative image by an identification apparatus of a third embodiment of the present invention are illustrated in FIG. 10. For example, as shown in FIG. 10(a), when a square area 103 specified as the face shape and encircled with a dotted line is replaced with an alternative image 101 by setting the coordinate factor to 2 and is displayed on the display device 23, a part of the alternative image 101 (a dotted line portion of the alternative image 101 in FIG. 10(b)) is positioned in the coordinate position out of the object data constituting the image data, as shown in FIG. 10(b). An outline of the process executed by the identification apparatus of the third embodiment of the present invention will be explained hereunder.

In the identification apparatus of the third embodiment of the present invention, as shown in FIG. 10(c), an origin (0, 0) specified by face register guides 102a (in FIG. 10, a point at which the cross hairs as a part of the face register guides 102a intersect with each other is used as an origin) is reset at another coordinates specified by the face register guides 102a, and the alternative image 101 is translated in parallel in response to an amount of transition of the origin.

In the identification apparatus of the third embodiment of the present invention, like the second embodiment, it is not said that the display position of the area 103 specified as the face shape always coincides with the display position of the alternative image 101. However, the user of the identification apparatus can set a numerical value of the coordinate factor further larger than that in the second embodiment even in a situation that, upon capturing the face image for use in the identification, the above adjusting operation is done by setting the coordinate factor to 1 or more to shift the alternative image more largely and more conspicuously following upon the shift of the display position of the face image. As a result, the preferred operability responding to the coordinate factor can be provided in the operation that aligns the face image with the face register guides.

The identification apparatus of the third embodiment of the present invention will be explained in detail hereunder. In the identification apparatus of the third embodiment of the present invention, functions are added to the alternative image generation controlling portion (in order to distinguish this alternative image generation controlling portion from the alternative image generation controlling portion 251 in the first embodiment and the alternative image generation controlling portion 351 in the second embodiment, a reference numeral "451" is allocated to the alternative image generation controlling portion). In this case, since the configuration of the identification apparatus of the third embodiment of the present invention is the same as that of the first embodiment and also the same reference numerals as those shown in FIG. 2 denotes the same portions explained in the first embodiment, their explanation in the third embodiment will be omitted herein. Also, since the processing steps executed by the identification apparatus of the third embodiment of the present invention are common except the process in steps S309 and S408 out of the flowchart shown in FIG. 3 are different their explanation in the third embodiment will be omitted herein.

When an alternative image generation controlling portion 451 receives the alternative image, which is correlated with the part to be replaced with the alternative image, from the face part extracting portion 253 after the process in step S407, it multiplies the center coordinates (50, −70) of respective square areas, which are specified as the shapes of face, eyebrows, eye, nose, and mouth out of the image data picked up by the capturing device 22 and input from the controlling portion 21, by the coordinate factor 2. Then, the alternative image generation controlling portion 451 calculates the coordinates (100−X, −140−Y) as the center position of the alternative image by subtracting position coordinates (X, Y), at which next face register guides are to be placed, from the position coordinates (100, −140) obtained by the multiplication. Then, the alternative image generation controlling portion 451 replaces the part with the alternative image corresponding to that part such that the center position of the alternative image coincides with the coordinates (100-X, −140-Y) (step S508. In order to distinguish this step from the step S308 explained in the first embodiment and the step S408 explained in the second embodiment, "S508" is allocated as the reference numeral). Then, the alternative image generation controlling portion 451 outputs the image data a part of which is replaced with the alternative image to the controlling portion 21. As the method of setting the position coordinates (X, Y) at which the next face register guides are placed, it may be considered that, upon reading the face register guides from the image identifying apparatus 26 in the process in step S302, the controlling portion 21 also reads in advance plural conditions that are applied to designate a pixel on the image data in which a center of the face register guides is placed (e.g., a pixel specified by the alignment number positioned at a predetermined rate to a total pixel number in the alignment representing the pixels in the longitudinal direction (or the lateral) is set as an origin), and then uses the position coordinate of the pixel designated by remaining conditions and calculated from the coordinate system as the position coordinate (X, Y) when the coordinate system in which one pixel designated by a certain condition is set as the origin (0, 0) is set.

The controlling portion 21 outputs the image data accepted from the alternative image outputting device 25 to the displaying device 23, and then causes the displaying device 23 to display a screen corresponding to the image data. Also, the controlling portion 21 causes the displaying device 23 to display the next face register guides being read from the image identifying apparatus 26 having the image identifying function, based on another condition that designates the pixel on the image data on which a center of the face register guides should be placed (step S509. In order to distinguish this step from the step S309 explained in the first embodiment, "step S509" is allocated as the reference numeral).

As described above, according to the identification apparatus of the third embodiment of the present invention, upon displaying the image picked up by the camera on the display device to get the face image for use in the face identification, the user of the identification apparatus displays the alternative image in the location corresponding to the user's own face of the image. Therefore, the user of the identification apparatus can conduct the face identification such that the user does not worry that other people take a glance at the face image when such user gets the face image for use in the face identification. As a result, the user of the identification apparatus of the present invention can conduct the face image identification more comfortably.

Also, according to the identification apparatus of the third embodiment of the present invention, the user of the identification apparatus can set the numerical value of the coordinate factor further larger than that in the second embodiment in a situation that the above adjusting operation is done by setting the coordinate factor to 1 or more to shift the alternative image more widely and more conspicuously following upon the shift of the display position of the face image, in picking up the face image for use in the face identification. As a result, the preferred operability responding to the coordinate factor can be provided in the operation that aligns the face image with the face register guides.

INDUSTRIAL APPLICABILITY

The identification apparatus and the identification image displaying method of the present invention possess such an advantage that the user of the identification apparatus can get the user's own face image for use in the face identification not to worry that other people take a glance at the face image and thus such user can conduct the face identification more comfortably, and is useful for the field concerning the identification apparatus that is used to identify the individual based on the face identification.

The invention claimed is:

1. An identification apparatus for conducting an image identification, comprising:
   a capturing portion which captures an image;
   an image storing portion which stores various alternative images;
   a face image specifying portion which specifies a first area, which contains at least a part of a face, out of the image captured by the capturing portion;
   an image generating portion which replaces the first area of the image captured by the capturing portion with an alternative image stored in the image storing portion, and which aligns said alternative image with a second area of the image that is calculated on the basis of a distance between a first point in the image and a second point in the first area of the image; and
   a displaying portion which displays a new image generated by the image generating portion.

2. The identification apparatus according to claim 1, wherein the first point coincides with a guide point that serves as an index with which the image captured by the capturing portion is aligned in an image identification.

3. The identification apparatus according to claim 1, wherein the second point coincides with a center of the first area.

4. The identification apparatus according to claim 1, wherein the image generating portion further aligns said alternative image with a third area of the image, which is generated by translating the second area in parallel in response to a positional relationship between the first point in the image and a third point in the image.

5. The identification apparatus according to claim 4, wherein the third point coincides with another guide point that is different in position from the first guide point and serves as an index with which the image captured by the capturing portion is aligned in an image identification.

6. The identification apparatus according to claim 4, wherein the image generating portion still further aligns said alternative image with a fourth area, which is enlarged/reduced around either a center of the second area or a center of the third area as basic points.

7. The identification apparatus according to claim 1, further comprising:
  an identification image storing portion which stores reference images that are referred to in identifying the image; and
  an identifying portion which conducts an image identification based on the image captured by the capturing portion and a reference image stored in the identification image storing portion.

8. An identification image displaying method of conducting an image identification, comprising:
  capturing an image;
  specifying a first area containing at least a part of a face out of the captured image;
  calculating a second area of the captured image on the basis of a distance between a first point in the captured image and a second point in the first area;
  replacing the second area of the captured image with another image; and
  displaying an image containing the second area that is replaced with another image.

* * * * *